United States Patent [19]

Miller

[11] 4,040,388
[45] Aug. 9, 1977

[54] METHOD AND APPARATUS FOR AUTOMATIC EGG INJECTION

[75] Inventor: Gary E. Miller, Salt Lake City, Utah

[73] Assignee: Agrimatic Corporation, Cerritos, Calif.

[21] Appl. No.: 662,257

[22] Filed: Feb. 27, 1976

[51] Int. Cl.² ............................................. A01K 45/00
[52] U.S. Cl. ..................................................... 119/1
[58] Field of Search ............................................. 119/1

[56] References Cited

U.S. PATENT DOCUMENTS 2,851,006  9/1958  Taylor et al. ............................ 119/1
3,120,834  2/1964  Goldhaft et al. ........................ 119/1

Primary Examiner—Hugh R. Chamblee
Attorney, Agent, or Firm—Cushman, Darby & Cushman

[57] ABSTRACT

Eggs are automatically inoculated with an antibiotic solution by a machine which heat-sterilizes a portion of the shell with a hot shoe, drives a square ended needle through the sterilized portion, injects the solution through the needle, withdraws the needle, heat-coagulates a portion of the egg albumin at the hole with the hot shoe and heat-sterilizes the needle before inoculating the next egg.

12 Claims, 2 Drawing Figures

METHOD AND APPARATUS FOR AUTOMATIC EGG INJECTION

This invention pertains to a method and apparatus for automatic injection of eggs, especially non-edible embryonated eggs and edible non-embryonated eggs. More particularly, the invention relates to a method which enables high volume immunization, sterilization or other treatment of hatching eggs by automatically introducing selected antibiotics, bactericides, vaccines, beneficiating chemicals, vitamins or the like into the eggs prior to incubation.

BACKGROUND AND SUMMARY OF THE INVENTION

A major problen in the poultry industry is the high incidence of infectious diseases which increase the cull rate and also cause a high rate of mortality during the growing stage of the young birds. It has thus become standard practice in commercial hatchery operations to immunize the birds against such diseases. The most widely used method of accomplishing this immunization is to manually inoculate (by injection of a suitable antibiotic) each individual bird after it has been hatched. Since a skilled operator can manually inject only approximately 800 young birds per hour, the operation is relatively expensive.

Another method of inoculation which has become quite popular, particularly in turkey hatcheries, is egg dipping, whereby a temperature differential or vacuum is used to force the antibiotic solution through the shell of the embryonated egg. This method has the advantage of lower labor costs than manual inoculation; however, because of varying shell porosity and thickness, the amount of solution absorbed by the egg varies dramatically. A test of 6,174 dipped eggs revealed that 18% of the eggs took in essentially no solution at all and additional 36% took in too little solution to be effective. From this test, it was concluded that dipping cannot stop the perpetuation of disease and even encourages the development of organisms resistant to these few antibiotics which are now effective.

Solution cost is also a detrimental factor in dipping. Most antibiotics are quite expensive with some coating over $64.00 per gallon. Approximately 24 gallons of dipping solution are consumed for every 100,000 eggs dipped. This is 1.06 ml per egg and is 5 to 10 times the average amount of solution that actually enters the egg.

Because of the high solution cost and uncertainties associated with dipping, few chick hatcheries dip eggs and almost all hatcheries that do dip eggs (primarily turkey hatcheries) also manually inoculate the day old birds.

One other method of inoculation involves the use of a hypodermic needle to inject the antibiotic solution into the egg. Egg injection is the only method known today that can introduce a precise and known quantity of solution into the egg. Day old birds that come from eggs injected prior to incubation all retain a sufficient amount of antibiotic, bactericide, vitamins or the like so that there is no need to manually inoculate the hatched bird. However, until the development of the invention described herein, the costs associated with egg injection made it impractical.

There are 3 major factors to be concerned with regarding egg injection. First, the region of the shell that is to be pierced must be sterile so there is no possibility of bacteria entering the egg during puncture. Second, the hole in the egg shell must be effectively sealed after injection to keep albumin from draining out and to keep bacteria from entering the egg. Third, the needle must be sterilized between injection; otherwise the possibility exists of transfer of bacteria from an infected egg to other eggs.

The use of a sharp pointed hypodermic needle to pierce a hole through the shell is often impractical for two reasons. First, the point on the needle rapidly becomes dull after only a few shells have been punctured. Second, the wedge-like action of the needle point causes the shell to fragment and the region around the hole to check and crack. A dental drill can be used effectively to drill a hole in the shell, and this technique has been used commercially, the drilling operation being followed by inserting a hypodermic needle through the drilled hole. After the antibiotic has been injected the hole is sealed with a cement. It is estimated that eight operators can manually inject 25,000 eggs per day by this method.

The present invention provides an automatic egg injection system which permits a much higher rate of egg treatment. It is estimated that with this system one trained operator can inject over 100,000 eggs per day.

One feature of the invention that makes high production rates possible is the use of heat to sterilize the surface of the egg prior to puncture of the shell. In the preferred embodiment this is accomplished by a heating element that contacts the surface of the egg at the point the puncture is to be made. An area on the surface typically 3/16 inch in diameter is heated rapidly to typically 180° – 220° F to kill surface bacteria.

Another feature of the invention is the use of heat to seal the hole in the shell after injection. In the preferred embodiment, after the antibiotic solution has been injected through a hole in the egg, a heating element is brought in contact with the egg at the point of puncture. Temperature is increased to typically 500° – 650° F for a brief period, typically about 2 seconds resulting in coagulation or cooking of the albumin in and just around the hole. The coagulated albumin acts as an effective sealant and blocks the entrance of any bacteria through the hole. The coagulated albumin also seals any checks or cracks that might have occurred during formation of the hole.

A further feature of this invention is the use of heat to sterilize the hypodermic needle between injections. After injection, the portion of the needle that penetrates the egg is withdrawn into a heating element. The portion of the needle that was inside the egg is heated to a temperature sufficient to kill any bacteria that might cling to the needle upon withdrawal from the egg.

A further feature of the invention is to form the hole in the shell with a cylindrical cutter having a squared-off or flat penetrating end which acts as a cutting die. The end of the special cutter is placed in contact with the egg, and the cutter is then given a sharp impact blow that drives it through the egg shell. This action, resulting from engagement of the entire circumference of the cutter with the shell at one time, causes a small circular disc the same diameter as the cutter to be sheared away from the shell. That is, the hole in the shell is the result of a "stamping" action that stamps out a circular piece of shell. The edge of the hole is clean and smooth. There is no fragmentation, nor are there any checks or cracks around the hole. Preferably the cutter is the hollow needle itself.

The squared-off or flat-ended needle may have an axial injection hole at its injection end, but preferably the end is closed and one or more radial injection holes are provided. The radial hole causes the antibiotic to be injected sideways into the albumin so as to avoid direct engagement with the yoke and embryo. In a high volume automatic production apparatus, such as is described in this invention, the antibiotic must be injected rapidly. Thus, the solution may enter the egg with considerable pressure. If this solution is injected straight into the egg through an end hole in the needle, there is considerable risk of the antibiotic directly contacting and damaging the embryo.

Another feature of this invention is the injection of solutions of one or more selected antibiotics, bactericides, vaccines, beneficiating chemicals, vitamins or the like into embryonated eggs using (1) heat sterilization of the egg surface and/or (.2) a needle having a square-off end to pierce the egg shell and/or (3) heat coagulation of the egg albumin to seal the pierced hole after injection and/or heat sterilization of the injection needle after injection and withdrawal from the egg. Specific examples of materials which may be injected are as follows: Garasol (Gentamicin sulfate), Tylusin, Encephalomyelitis Vaccine, Bronchitis Vaccine, Coccidiosis Vaccine, Erysipelas Vaccine, Fowl Cholera Vaccine, Fowl Coryza Vaccine, Fowl Pox Vaccine, Gumboro Vaccine, Laryngotracheitis Vaccine, Marek's Disease Vaccine, Newcastle Vaccine, Pigeon Pox Vaccine, Thiamine, Pyridoxine, Pontothenic Acid, Ribioflabin, Folic Acid, Niacin, Choline, Biotin, Vitamin B-12, Vitamin A, Vitamin D, Vitamin E, and Vitamin K.

DETAILED DESCRIPTION OF AN EXEMPLARY EMBODIMENT

IN THE DRAWINGS

Figure 1:
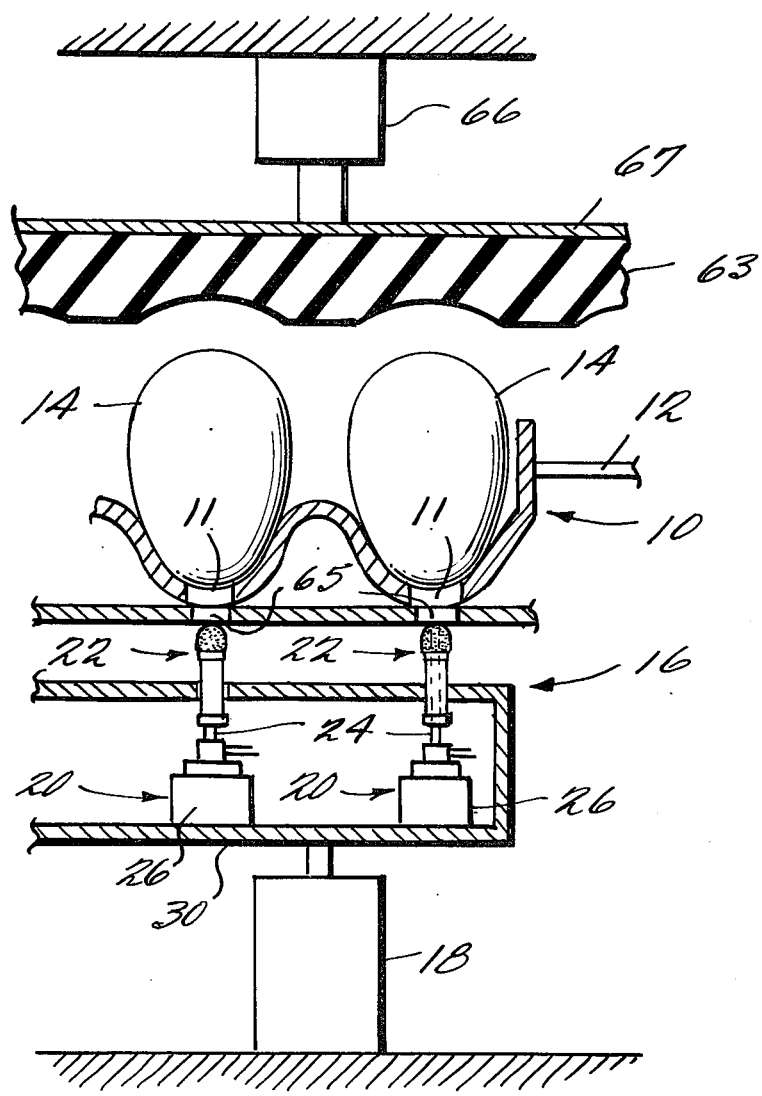
Figure 2:
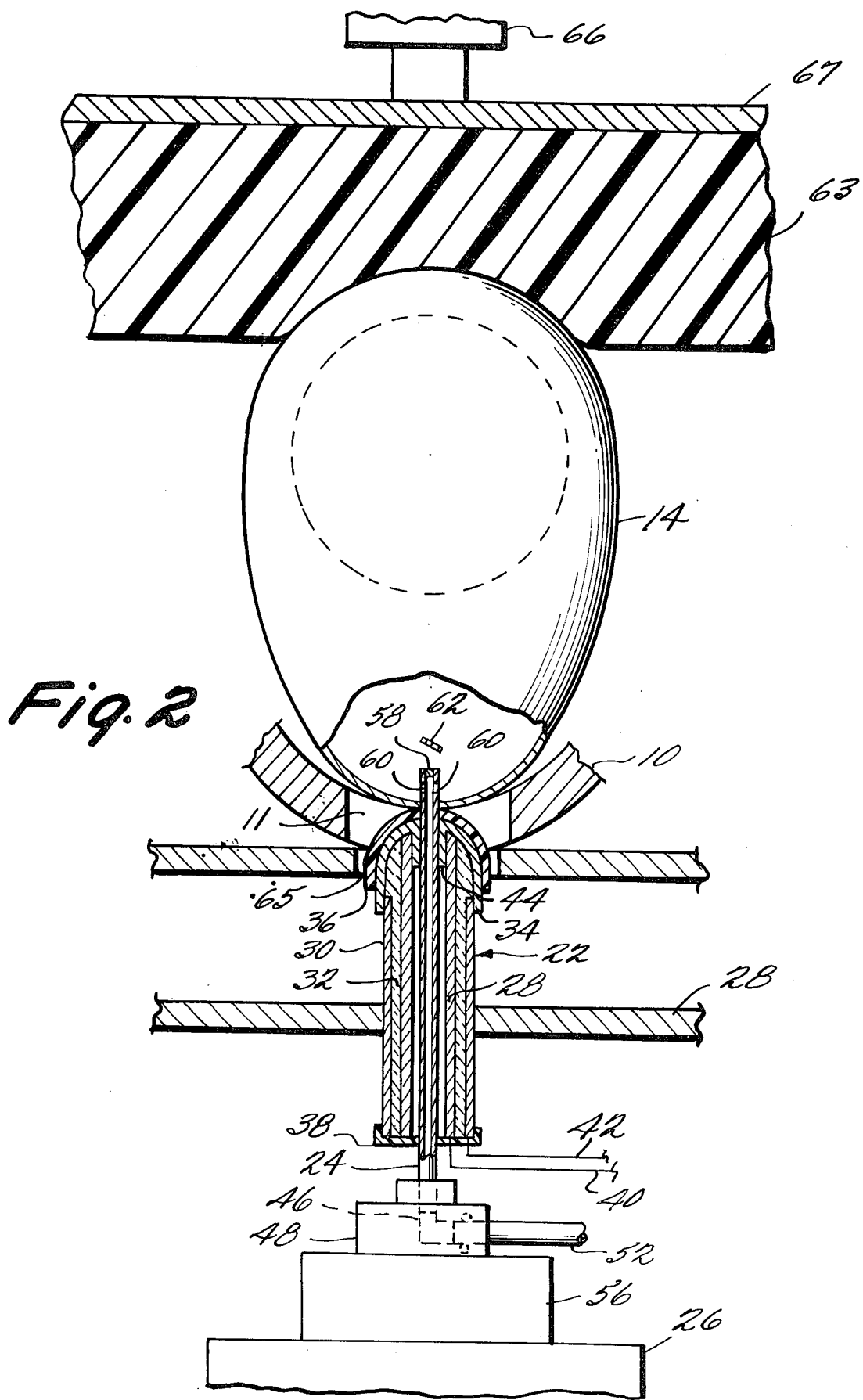

FIG. 1 is a schematic fragmentary vertical sectional view of a system for injecting a plurality of eggs simultaneously; and FIG. 2 is a detailed vertical sectional view of a portion of FIG. 1.

Referring to FIG. 1, there is shown a portion of a filler flat 10 supported by a stationary plate 64 and capable of holding a plurality of eggs 14, typically 30 eggs in five rows of six eggs each or 20 eggs in four rows of five eggs each. The bottom of each egg holding depression is provided with a hole 11 of about ⅜ inch diameter into which the smaller end of the respective egg 14 projects. The holes 11 in the filler flat 10 are aligned via locating brackets 12 over holes 65 in the plate 64. Below the plate 64 is an egg-injection assembly 16 which is mounted for vertical movement toward and away from the plate 64 by means of a hydraulic cylinder 18. The assembly 16 includes a plurality of injection units 20 each of which comprises a cylindrical hot shoe unit 22 of about ¼ inch diameter, a hollow needle 24 disposed axially in its respective shoe unit 22 and a device 26 for moving the needle 24 relative to its shoe unit 22. This needle moving device 26 may be in a spring actuated mechanism, a linear acting solinoid, an air cylinder or the like. Each injection unit 20 is located directly below one of the holes 11 in the filler flat 10. The hot shoe units 22 are connected to an upper wall 28 of the assembly 16 and the needle moving devices are supported by a bottom wall of the assembly so that extension and retraction of the needle moving devices 26 moves the needles 24 upwardly or downwardly, respectively, relative to the shoe units 22.

A plastic foam cushion 63 is attached to a plate 67 that is moved vertically upward or downward by a hydraulic cylinder 66. The plastic foam cushion 63 holds the eggs 14 in position and keeps them from tipping when the injection units 20 are raised.

As shown in FIG. 2, each hot shoe unit 22 is constructed of inner and outer electrically conducting tubes 28 and 30 separated by electrically insulating material 32. A heating element 34 having a spherical upper end is fitted over the upper ends of the tubes 28 and 30 in electrically conducting contact therewith. A cover or coating 36 of a material such as polytetrafluorothylene is bonded to the spherical surface of the heating element 34.

The lower end of the hot shoe unit 22 is closed by a cap 38. Electrical leads 40 and 42 pass through the cap 38 and are connected to the tubes 28 and 30 respectively.

The needle 24, typically an 18-gauge hypodermic needle with a squared-off end free of burrs, is axially supported within the inner tube 28, as by being slidably mounted in a hole in the cap 38 and in a hole in a boss 44 on the inner surface of the heating element 34. Conveniently, this boss 44 snugly fits into the inner tube 28 to aid in locating the heating element 34 relative to the tubes 28 and 30. The lower end of the needle 24 screws into a cylindrical cavity in a holder 48. Antibiotic solution is delivered from a metered injection pump (not shown) by means of a flexible tube 52 which is sealed in the cavity 46 in the holder 48 by an O-ring 54. The holder 48 is connected to the upper end of a piston 56 which extends from the needle moving device 26.

The squared-off upper end of the needle 24 is closed with a plug 58 and is provided with two radial outlet holes 60. The squared-off end has a sharp circular edge which cuts out a disc 62 of egg shell when the needle is given a high acceleration by the needle moving device 26.

Operation of the apparatus is as follows. FIG. 1 illustrates the parts in a retracted position and FIG. 2 illustrates the parts in an extended position. In FIG. 1, the cylinder 18 has retracted the egg-injection assembly 16 to a position in which the cushion 63 and the upper ends of the hot shoe units 22 are out of contact with the eggs 14. Also in FIG. 1, the needle moving devices 26 have retracted the needles into their respective hot shoe units 22. To initiate an injection cycle, the cylinder 66 is extended to lower the foam pad 63 until it contacts the eggs 14 exerting a slight amount of pressure on the eggs 14. The cylinder 18 is then extended to raise the assembly 16 to a position in which the upper ends of the hot shoe units 22 engage the lower surfaces of all eggs 14 on the filler flat 10. Because of varying egg sizes, some eggs 14 will be lifted off the flat 10 as much as ⅜ inch. The foam cushion 63 supports these raised eggs 14 and keeps them from tipping.

The heating element 34 has previously been heated to a temperature of 180°-220° F. by electrical current supplied from a control device (not shown) through the leads 40, 42 and the tubes 28, 30. This temperature is sufficient to kill all or substantially all bacteria within about one second over an area of the egg shell of about 3/16 inch diameter but insufficient to produce any appreciable coagulation of albumin in the corresponding area inside the egg. During the operation, the upper end of the needle 24 is flush with the upper surface of the jacket 36 on the upper end of the shoe unit 22.

The needle moving device 26 is now extended rapidly. The needle 24 is driven out of the shoe unit 22 and into the egg 14 a precise distance, typically 0.2 inch, with an impact blow, causing the end of the needle 24 to cut through the egg shell by cutting out a disc 62 of the shell. This is the position shown in FIG. 2.

Immediately after entry of the needle 24 into the egg 14, a precise quantity of solution, typically 0.1 - 0.2 ml is injected from an injection pump (not shown) through the tube 52, holder 48 and the needle 24. Typically the solution is injected at high pressure and it is for this reason that it is desirable to use radial holes 60 in the end of the needle 24.

Electrical current flow through the heating element 34 is now increased rapidly by the controller (not shown) to about 500° - 650° F. This causes the albumin at the location of the needle to begin coagulating but there is insufficient heat to produce coagulation further inside the egg. After about one second, the needle moving device 26 retracts, withdrawing the needle 24 from the egg 14. Albumin which attempts to follow the needle 24 out of the egg 14 is rapidly coagulated by the heat and in so doing seals the hole.

After about one more second, the injection assembly 16 is lowered by the cylinder 18 thus moving all the shoe units 22 away from the eggs 14 to the FIG. 1 position. Current through the heating elements 34 is reduced by the controller to allow the temperature of the elements 34 to fall to about 180° - 220° F. The upper ends of the needles, being in thermal contact with the heating elements 34 become sterilized while the filler flat 10 is being removed and replaced with another filler flat of un-inoculated eggs.

The total injection time is about five seconds, from the raising of the assembly 16 to lowering of the assembly 16. An additional five seconds is required to replace the filler flat 10.

What is claimed is:

1. A method of injecting a fluid into an egg comprising: heat-sterilizing the exterior surface of a portion of the shell of the egg; driving a hollow needle having a squared-off end through the sterilized shell portion thereby forming a hole in the shell; injecting fluid through the needle into the egg; withdrawing the needle from the hole; sealing the hole by heat-coagulating a small portion of the egg albumin at the location of the hole; and heat-sterilizing the needle.

2. A method as in claim 1 wherein the shell sterilizing step includes applying heat to said portion of the shell by contacting said portion with a heating element.

3. A method as in claim 1 wherein the sealing step includes applying heat to said shell portion by contacting said portion with a heating element.

4. A method as in claim 1 wherein the shell sterilizing step includes contacting said shell portion with a heating element; wherein said needle passes through said heating element into engagement with said shell portion, wherein the sealing step includes increasing the temperature of the heating element while in contact with said shell portion, and wherein the needle sterilizing step includes withdrawing the needle from the egg into a thermal zone heated with said heating element.

5. In a method of injecting fluid into an egg by forming a hole through the egg shell, inserting a hollow needle through the hole and injecting fluid through the needle into the egg, the improvement which comprises sterilizing a small area of the shell by contacting said area with a heating element for a sufficient time and maintained at a sufficient temperature to kill substantially all bacteria on said area and thereafter forming the hole at said sterilized area.

6. In a method of injecting fluid into an egg by forming a hole through the egg shell, inserting a hollow needle through the hole and injecting fluid through the needle into the egg, the improvement wherein the hole is formed by impacting a flat-ended cylindrical cutter against the shell, said cutter having a sharp circular cutting edge, the entire circumference of which engages the shell at substantially the same time thereby forming the hole by cutting out a disc-shaped piece of shell.

7. In a method of injecting fluid into an egg by forming a hole through the shell, injecting fluid through the hole and then sealing the hole, the improved sealing step which comprises applying sufficient heat to the area of the hole to cause coagulation of albumin only at the hole.

8. A method as in claim 7 wherein the heat is applied to the area of the hole by contacting the area of the hole with a heating element.

9. Apparatus for injecting fluid into an egg comprising a heating element having a hot surface for contacting a small portion of the shell of an egg, a hollow injection needle having at least one discharge opening at one end, said needle being disposed within said heating element for longitudinal movement between a retracted position and an extended position in which said one end projects beyond said hot surface of said heating element, means for effecting relative movement between an egg and said heating element so as to engage said hot surface of the latter with a small portion of the egg shell to thereby heat-sterilize said shell portion, means for moving said needle to its extended position relative to said heating element to thereby pierce the egg shell, and means to inject fluid through said needle into the egg when said needle is in its extended position.

10. In a method of injecting fluid into an egg by forming a hole through the egg shell and injecting fluid through the hole into the egg the improvement which comprises forming the hole by cutting a piece of shell and forcing the piece of shell into the egg and sealing the hole after injection of fluid by coagulating a small portion of the egg albumin only at the hole.

11. A method as in claim 10 including sterilizing a small exterior area of the egg shell at the location of the hole prior to forming the hole.

12. A method as in claim 11 wherein the sterilizing is carried out by heating said area for a time and at a temperature sufficient for sterilization but insufficient to produce any appreciable coagulation of egg albumin in the corresponding area inside the egg.

* * * * *